United States Patent [19]

Cox

[11] Patent Number: 4,696,950
[45] Date of Patent: Sep. 29, 1987

[54] SUBSTANTIALLY STATIC-FREE, CELLULAR EXPANDED OR FOAMED THERMOPLASTIC ARTICLES, INCLUDING CUPS AND CONTAINERS, AND PROCESSES FOR THE MANUFACTURE OF THESE ARTICLES INCLUDING THE MANUFACTURE OF INTERMEDIATE MATERIALS SUITABLE FOR USE IN SUCH MANUFACTURE

[75] Inventor: Harold S. Cox, Greenford, England

[73] Assignee: Roboserve Limited, Greenford, England

[21] Appl. No.: 807,812

[22] Filed: Dec. 11, 1985

Related U.S. Application Data

[63] Continuation-in-part of Ser. No. 563,580, Dec. 20, 1983, abandoned, Ser. No. 563,620, Dec. 20, 1983, abandoned, and Ser. No. 563,610, Dec. 20, 1983, abandoned.

[30] Foreign Application Priority Data

Dec. 23, 1982 [CA] Canada .................................. 418528

[51] Int. Cl.$^4$ .............................. C08J 9/22; C08J 9/24
[52] U.S. Cl. ........................................ 521/57; 428/35; 428/222
[58] Field of Search ..................... 521/57; 428/222, 35

[56] References Cited

U.S. PATENT DOCUMENTS

| | | | |
|---|---|---|---|
| 2,989,782 | 6/1961 | Barkhuff Jr. et al. | 521/57 |
| 3,429,737 | 2/1969 | Marsden | 521/57 |
| 3,480,570 | 11/1969 | Roberts et al. | 521/57 |
| 3,560,414 | 2/1971 | Miskelh et al. | 521/57 |
| 3,595,464 | 7/1971 | Harrison | 521/57 |
| 3,637,538 | 1/1972 | Heald | 521/57 |
| 3,789,028 | 1/1974 | Heiskel et al. | 521/57 |
| 3,796,366 | 3/1974 | Hahn | 521/57 |
| 3,817,879 | 6/1974 | Walter | 521/57 |
| 3,908,069 | 9/1975 | Muirhead | 521/57 |
| 4,238,570 | 12/1980 | Shibata | 521/57 |
| 4,302,549 | 11/1981 | Crowley | 521/57 |
| 4,312,957 | 1/1982 | Spicuzza, Jr. | 521/57 |
| 4,438,058 | 3/1984 | Tanaka | 521/57 |
| 4,556,680 | 12/1985 | Braemer | 521/60 |

FOREIGN PATENT DOCUMENTS 2097797 11/1982 United Kingdom .

*Primary Examiner*—Morton Foelak
*Attorney, Agent, or Firm*—James Fornari; Ivor M. Hughes

[57] ABSTRACT

Substantially static-free, cellular expanded or foamed thermoplastic articles, including cups and containers, and processes for the manufacture of these articles including the manufacture of intermediate materials suitable for use in such manufacture.

54 Claims, 3 Drawing Figures

SUBSTANTIALLY STATIC-FREE, CELLULAR EXPANDED OR FOAMED THERMOPLASTIC ARTICLES, INCLUDING CUPS AND CONTAINERS, AND PROCESSES FOR THE MANUFACTURE OF THESE ARTICLES INCLUDING THE MANUFACTURE OF INTERMEDIATE MATERIALS SUITABLE FOR USE IN SUCH MANUFACTURE

FIELD OF INVENTION

This application is a continuation-in-part application of U.S. patent applications Ser. Nos. 563,580; 563,620; and 563,610 all filed Dec. 20, 1983, all now abandoned.

This invention relates to substantially static-free, cellular expanded or foamed thermoplastic cups and containers suitable for use with comestibles and processes for the manufacture of these articles including the manufacture of intermediate materials suitable for use in such manufacture.

BACKGROUND OF THE INVENTION

Expanded cellular or foamed thermoplastic cups and containers have been known in the art for some time. They are normally moulded from expanded polystyrene, prepared from expanded polystyrene beads, initially containing approximately 5% by weight of hydrocarbon blowing agent. The closed cell structure of the expanded polystyrene cups, for example, is made at a density of around 4 to 6 pounds per cubic foot, with an internal volume of about 200 cubic centimetres and a weight from slightly less than about two grams to greater than about three grams to provide a desired degree of thermal insulation. The processing of the cups from the polystyrene beads involves pre-expansion of the beads, the addition of a small percentage by weight of a moulding/fusion lubricant (commonly zinc stearate), the ageing of the beads under regulated conditions (for example, if the expansion takes place in a hot air pre-expander, it may be dried and aged in dry conditions for between about 6 to about 24 hours) to allow equilibration of the blowing agent, and finally, the deposition of the pre-expanded beads into a cup mould for fusion by the application of heat for example, by the use of dry steam. During the moulding operation, the initially spherical pre-expanded polystyrene beads expand further and fuse to each other, assuming for example, a dodecahedral shape, yielding a leakproof moulded cup.

Conventional zinc stearate lubricated, moulded, expanded polystyrene cups exhibit dielectric characteristics similar to polystyrene and are readily statically charged, causing deposited powdered comestibles to stick to the sides and nested cups in a stack to stick together preventing their separation when one is to be dispensed from the stack.

In many instances, the electrostatic force between the cups is greater than the stripping or discharge force applied to drop the lowermost cup from the stack of cups. Particularly, the expanded, cellular or foamed thermoplastic cups which weigh in the order of about 1.8 grams are impeded by the slightest electrostatic forces keeping the cups together, from dropping from the stack of cups down the chute. Additionally, because of the static charge adhering to the cup side wall, comestible deposited in the lower cup tends to cling to the inner side wall so that comestible in contact with the outer side wall of the upper adjacent cup is transferred to the outer side wall of the cup.

Expanded polystyrene beads hold static charges for a long time, sometimes months. Where the expanded beads are in containers or cups to hold powdered comestibles for mixture with water, it is desirable that the anti-static charges be dissipated. In this regard, the surface conductivity must be changed. Where molecules on the surface for providing anti-static characteristics absorb water, the static charge is dissipated. Therefore, the molecules must have hydrophillic bonds in order to dissipate anti-static charges. However, where the anti-static material or agent is too hydrophillic, it allows the water to wet the beads too much and therefore, the water goes through. On the other hand, where the anti-static agent is too hydrophobic, i.e. does not have sufficient water-attracting molecules, then there is little done by the said agent to dissipate the static charge in the material. Therefore, a balance between hydrophillic bonds and hydrophobic bonds must be made in the anti-static agent.

A number of approaches have been proposed to reduce or eliminate static entirely. U.S. Pat. No. 3,206,429 teaches improved polyethylene compositions containing N,N-diethanol oleamide which compositions are purported to exhibit improved anti-static properties. The compositons can be prepared by dissolving the N,N-diethanol oleamide in isopropanol or other suitable solvent and externally coating polyethylene pellets by thoroughly mixing the pellets and solution in any suitable tumbling or stirring-type mixer. The coated pellets are then formed by any of the conventional methods into moulded objects or film exhibiting the desired anti-static properties.

This approach was carried over in U.S. Pat. No. 3,236,681 to the manufacture of articles consisting of foamed thermoplastic materials (in one example, expandable polystyrene particles). U.S. Pat. No. 3,236,681 discloses a process of coating expandable thermoplastic polymer particles with a film of an aqueous solution of an anti-static agent comprising a salt of an alkyl diacid phosphate of the formula X(RHPO4)n, where X may be for example, ammonium or alkali metal, n may be 1-3, and R may be an alkyl moiety containing 1-18 carbon atoms (for example, ammonium amyl hydrogen phosphate). The coated particles are then dried and then prefoamed by passing them under an infrared heater.

As a critical feature of the invention, the patent teaches deposition of at least 0.01% of the salt of an alkyl diacid phosphate on the surfaces of the expandable polymer particles based on the weight of the polymer particles with the preferred quantity being in the range of about 0.01% to about 0.1%. Where it is desired to have deposited thereon in the dried state an amount in excess of 0.10% of the salt of an alkyl diacid phosphate, the Patent teaches the incorporation of a sulfate salt with the anti-electrostatic agent, to prevent agglomeration.

While U.S. Pat. No. 3,236,681 teaches the coating of expandable polystyrene particles with an anti-static agent and prefoaming the coated particles for further processing, U.S. Pat. No. 3,595,464 specifically relates to foamed polystyrene cups and teaches the coating of the particles with a detergent (for example, aluminum lauryl sulfate and an organic amide builder) by for example, tumbling the beads in some sort of container and adding the detergent in liquid form, for fully coating the entire surface of all the beads, prefoaming the coated beads and then charging them into a mould for manufacturing a foam polystyrene cup. The patent then teaches that by this process, the surfaces of foamed polystyrene cups may be considered to be covered with film as well as the interface between adjacent fused beads through the walls and bottoms of the cups. However, where solutions are tumbled with the bead to coat them and the coated beads are dried, some if not a substantial part of the coating agent will evaporate and consequently, there will be very little of the coating agent left to uniformly coat the beads when pre-expanded. as a coat or film on the beads, it will not remain where it is when dried. Some will evaporate and some will be driven off.

Furthermore, the detergent or any detergent would be to hydrophillic, its purpose being to break down any fats and thus it would attract substantial water molecules and causes any cup to leak like a sieve, passing water therethrough.

U.S. Pat. No. 3,796,366 discloses a different approach, teaching the application of an aqueous non-ionic emulsion of polyethylene and thence subjecting the article to drying conditions to remove substantially all the water therefrom.

U.S. Pat. No. 3,796,366 relates to anti-static plastic articles which incorporate a non-ionic compound of the formula:

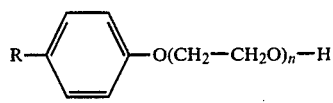

wherein R is an alkyl group having 8 to 9 carbon atoms and n is an average number from 7 to 15.

U.S. Pat. No. 4,438,058 corresponds to United Kingdom application No. 20 977 97 and DE application No. 3,208,485 and provides a process for blowing expandable resin particles which comprises expanding resin particles in the presence of surfactants in the amount of 0.5 to 10% by weight based on the particles. However, the inventor only discloses in his examples, beads that have first been coated, then pre-expanded with steam. Once again, if the beads are coated, then dried, anti-static agent is driven off.

The German article by Dr. S. Riethmayer, entitled "Antistatika" includes a discussion of the application of materials for anti-static purposes. See for example:

(a) at page 306 Olsaurediathanolamid and the reference at the top of the right-hand column to Laurinsaurediathanolamid and Linolsaurealkylolamide;

(b) the bottom of page 420 and the reference to Aliphatische Sulfate and "hydrophobem";

(c) at page 421 right-hand column wherein the term "Hydrophilie durch Anhaufung hydrophiler Gruppen" is used; and (d) at page 426 the disclosure of "Laurinsaure Sorbitmonolaurat" and "Glycerinmonostearat Athoxy Ette Glycerinmonofettsaureester".

U.S. Pat. No. 4,255,525 which corresponds to European application No. 0009082 teaches the coating of small particles of expandable styrene polymer for moulding compositions by coating with betaines having the formula:

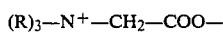

where R is the same or different and has 1 to 5 carbon atoms to prevent the build-up of anti-static charges of the surface. However, because the material disclosed in the patent has very little hydrophobic material and considerable hydrophillic material, the material taught by the said patent is too hydrophillic to be a suitable anti-staic agent. Furthermore, it is apparent that the process disclosed in the U.S. Pat. No. 4,255,525 cannot produce any suitable anti-static material because the drying of the material in the drying process will cause a loss of anti-static agent.

U.S. Pat. No. 4,302,549 is an interesting patent in that it teaches a process for the expansion of an expandable polymeric bead material by exposing the bead material to steam in an elevated temperature to affect the expansion of the material into a polymeric free-flowing particulate bead material while tumbling the bead material a lubricant for the bead material. In the process, the lubricant material (which is steam degradable) degrades on the exposure to steam so that its characteristics are substantially diminished in lubricant characteristics to provide an expanded polymeric foam bead material having a reduced surface lubricity. As is apparent, first of all the process requires water to break down the added material so that lubricity is reduced. As is apparent, the process of U.S. Pat. No. 4,302,549 cannot use powder as it needs moisture to get the effect claimed.

Consequently, the material employed would be too hydrophillic for use with comestibles, as for example, for a cup or container.

The difficulty with these approaches with respect to the manufacture of expanded polystyrene cups is that no expanded polystyrene cups suitable for use in association with comestibles have even been made by these methods.

Other patents dealing with the coating of beads are known although they do not relate to the use of an anti-static coating material.

U.S. Pat. No. 2,989,782 discloses a method for preparing moulded foam resin articles in which the surface shell resin differs from the chemical composition of the interior core of the resin particles but which does not disclose a finished anti-static article. Nor is any of the compatible organic compounds which are incorporated into the surface shell a good anti-static agent. The materials disclosed are too hydrophobic to constitute a suitable anti-static agent. Nor is there any disclosure of any process carried out to make an anti-static article.

U.S. Pat. No. 3,429,737 employs an amide of a $C_{12-20}$ aliphatic hydroxy monocarboxylic acid as an anti-sticking coating for foamed polystyrene articles. No mention is made of anti-static properties of the material and there is none perceived. Additionally, the use of the coating material does not provide any anti-static properties. The compounds mentioned are essentially hydrophobic and thus would not confer anti-static properties.

Likewise, U.S. Pat. No. 3,480,570 discloses the use of a material (a surface active agent) that becomes incorporated into the particles of the polymer which is a suitable anti-static agent. Particularly, the materials proposed in this reference are too hydrophobic to be a suitable anti-static agent.

U.S. Pat. No. 3,560,414 discloses materials that coat the surface of the beads before impregnation with the butane which materials are too hydrophobic to be suitable. None of the materials disclosed therein is an anti-static agent.

U.S. Pat. No. 3,637,538 discusses the tumbling of foamable polystyrene particles with a specified coating agent, grinding them and then prefoaming the coated particles in a continuous prefoaming apparatus. However, the proposed coating agents cannot be anti-static since they are too hydrophobic. Where solutions are tumbled with foamable polystyrene particles to coat them and then dried, some if not a substantial part of the coating agent will evaporate and consequently, there will be very little of the coating agent left for uniformly coating the expanding particles.

U.S. Pat. No. 3,637,538 also teaches a coating material for coating styrene polymer but nowhere is there a suggestion of any anti-static material. Because the triester used has mostly ester molecules, it is most hydrophobic. The diester is substantially hydrophobic with the monoester least hydrophobic. The coating agent described in claim 1 is lipophilic, meaning "fat-attracting" so that minimal anti-static characteristics are provided.

U.S. Pat. No. 3,817,879 is to the same effect. Material that is too hydrophobic to be anti-static is disclosed.

U.S. Pat. No. 4,238,570 does not teach any anti-static materials which are used as a surface coating agent. This is clearly apparent from the disclosure because there are no hydroxyl groups in the molecules disclosed. The molecule is such as to be hydrophobic. Additionally, the process taught merely affects the shortening of the cooling time during moulding by using expandable particles of styrene polymer containing an ester of an aliphatic carboxylic acid with an aliphatic alcohol having no hydroxyl group in the molecule.

U.S. Pat. Nos. 3,908,069 and 4,312,957 do not disclose any materials possessing anti-static characteristics.

U.S. Pat. No. 3,908,069 merely provides coated expanded particles.

U.S. Pat. No. 4,312,957 provides for the incorporating of a synergistic mixture of surfactants into a polymer during the impregnation of the polymer with a blowing agent. There is no mention of anti-static characteristics. The material is provided solely for fast cooling.

French application No. 2,404,022 does not disclose any anti-static properties in the lauric diethanol amide (Lankrostat JP) which is used only as an emulsifier for the incorporation of the blowing agent.

It is therefore an object of this invention to provide processes suitable for use in the manufacture of substantially static-free expanded, cellular or foamed thermoplastic cups and containers which overcome the aforementioned difficulties with the prior art and which processes employ anti-static agents suitable for use with comestibles.

It is a further object of the invention to provide anti-static foamed thermoplastic cups and containers suitable for use in association with comestibles.

Further and other objects of the invention will be realized by those skilled in the art from the following summary of the invention and detailed description or preferred embodiments thereof.

SUMMARY OF THE INVENTION

According to one aspect of the invention, a process of combining an anti-static agent with thermoplastic bead to be pre-expanded for use to manufacture cups of containers of cellular expanded or foamed thermoplastic material, or, fully expanded into a cup or container of cellular expanded or foamed thermoplastic material is provided, the anti-static agent being an effective anti-static agent suitable for use with comestibles and being combined in sufficient amounts, either:

(a) with thermoplastic bead to be expanded prior to injection into a pre-expander (preferably a hot air expander) and thereafter injecting the combination into the preheated pre-expander for pre-expanding the bead (and thereafter aged, maintaining the bead under anhydrous conditions until used to be fully expanded (with for example, steam) into the static-free cup or container); or (b) with the bead in a preheater (preferably a preheated hot air moisture-free pre-expander) shortly after injection of the bead into the preheated pre-expander substantially for pre-expanding the bead; or (c) in liquid form with dry steam for delivery to a moulding cavity of a mould for intermixing with pre-expanded bead (for example, pre-expanded in a hot air expander and substantially being free of water and thereafter aged and stored under anhydrous conditions to be water-free) for moulding into the cup or container, whereby the anti-static agent upon contacting the heated environment, is misted or atomized, filling the space of the environment, uniformly coating the expanding bead with the agent in the space and rendering the material anti-static. Because many of the suitable surface active agents or emulsifiers are solids, have melting points slightly above, or at, room or ambient temperature, and become somewhat sticky at room or ambient temperature, they may be maintained in a refrigerated environment until ready for use. In solid form they may be cryogenically ground into a fine powder and refrigerated until used.

Therefore, where the anti-static agent is in solid form and is combined with the bead outside of the pre-expander, the mixing with bead is accomplished at a temperature and in a form (for example, small particles) to permit the mixing thereof (for example, in the case where the solid anti-static agent melts at a temperature slightly above or at room or ambient temperature), the solid is maintained at a temperature below its melting point or point whereat it becomes sticky (and where required, ground into an appropriate size), and thereafter, the mixture as combined is heated (in for example, a preheated pre-expander) to a temperature to permit expansion of the beads and the atomizing or misting of the solid anti-static agent filling the space of the environment, uniformly coating the expanding beads.

In some instances, the anti-static agent (solid surface active agent or emulsifier) may be acquired as a solid block. In that event, the material may be cryogenically sticky or melt. If the material comes as a powder or is flaked, it may be added to the bead mixture and mixed therewith at a temperature to prevent melting or sticking of the anti-static material and thereafter, injecting the combination into the pre-expander where the anti-static agent is atomized or misted in the mixture to uniformly coat the bead as its expands to the desired density.

If the anti-static agent to be combined with the bead is in liquid form, and is to be mixed with the bead prior to being added to the heated pre-expander, the anti-static agent is mixed with the bead and thereafter the combination heated (as for example, being injected into the pre-expander) to permit the expansion of the beads (preferably under substantially anhydrous conditions) and the atomizing or misting of the liquid anti-static agent filling the space of the environment uniformly coating the expanding bead.

If the anti-static agent to be combined with the bead is in liquid form, the liquid anti-static agent may also be injected into a heated environment (for example, a preheated pre-expander) separately from the bead wherein it atomizes or mists, filling the environment, uniformly coating the expanding bead when added.

In this instance, the liquid anti-static agent may be metered into a heated pre-expander to which a premeasured amount of bead is added.

Because pre-expansion takes place at a temperature of about 212 degrees F. (about 100 degrees C.) where the hot air in the pre-expander is between about 275 degrees F. (about 135 degrees C.) to about 300 degrees F. (about 149 degrees C.), the metered liquid sprayed into the hot pre-expander and heated to the suitable temperature, mists or atomizes uniformly entirely coating the bead as the bead expands.

Where the thermoplastic material has been pre-expanded with the anti-static agent, the coated pre-expanded bead is then stored under anhydrous conditions for use in the final expansion process during moulding. When employed in the final moulding process, the anti-static agent coating the bead may also act as a lubricant in the mould. However, when coated pre-expanded bead is used because of the confining volume of the mould, the coated anti-static bead is fully expanded and moulded into the finished cup or container wherein each fused fully-expanded bead carries a coating of anti-static agent on its entire outer surface between it and the adjacent beads, thereby presenting the interior and exterior surfaces of the cup or container carrying a coating of anti-static agent over their entire surfaces.

It is also to be appreciated that the beads of thermoplastic material used in the processes contain the necessary volatile blowing agent to enable expansion.

If the thermoplastic bead has been pre-expanded without the anti-static agent, a predetermined amount of anti-static agent may be injected (in liquid form) into the line carrying the dry steam to the moulding cavity of the mould (and not the steam usually passed through the galleries of the moulding equipment for heating purposes) wherein it mists or atomizes, filling the mould, coating the pre-expanded bead material during final expansion of the bead to form the final moulded product. Once again, because of the confining volume of the mould, the expanding beads are entirely coated by the anti-static agent used wherein each fused fully-expanded bead carries a coating the adjacent beads, thereby presenting the interior and exterior surfaces of the cup or container carrying a coating of anti-static agent over their entire surfaces.

Preferably, when the anti-static agents are added to the bead to be expanded either prior to, or during, pre-expansion, or added in liquid form during final expansion, the said agents are added in amounts of about, or in excess of about 0.1 % by weight, and preferably, in excess of about 0.2% by weight. Amounts of anti-static agent added of about 0.5% by weight of the beads to be expanded also provide satisfactory results. So do amounts in excess of 1%, 1.5% and 2%. While acceptable results are obtained when the anti-static agent is added in amounts to about 5% by weight of the beads to be expanded, the cost of the anti-static agent may deter such amount from being added. In amounts of about 6.25% of anti-static agent to the weight of the the flow characteristics of the bead so treated were not as acceptable for proper fusion for the formation of the articles. Some quality problems at these percentages may be overcome however by the use of a pressure fill system, but the use of such percentages in such system would make characteristics of the bead so treated may also be enhanced by the addition of zinc stearate, but the cost of manufacture would also make the product not cost effective.

If too much anti-static agent is added, the moulded product also sticks in the mould. Therefore, when pre-expanded bead is combined with the anti-static agent in the mould, the amount of anti-static agent intermixed is controlled to ensure minimal sticking.

While agent added in an amount much less than about 0.1% by weight, reduces static slightly, the static dependent upon the amount of anti-static agent added would not be reduced sufficiently to give a satisfactory static-free article.

In one embodiment, pre-expansion may be accomplished using a hot air pre-expander. In this instance, the heat may be provided by dry air which has passed through heated elements. The bead is expanded until the batch occupies a predetermined volume and then is blown out of the chamber. Powdered anti-static agent is blended with the bead prior agent is injected directly into the expansion chamber after the bead was put into the heated pre-expander. The anti-static agent atomizes or mists in the hot environment as the bead expands, coating the bead with anti-static agent.

After pre-expansion to the desired density, the bead is screened and then transported to breather bags. The bead is then dried and aged for 6 to 24 hours.

Once appropriately aged, the bead is ready for use in the manufacture of, for example, EPS (expanded polystyrene) cups and containers. At this point, it is transferred to a small hopper above the moulding machine. The moulding machine will carry out the following sequence to manufacture a foam cup/container.

The die-set opens and closes, during which time steam at approximately 700 KPa is passed through the mould heating system. This purges any remaining cooling water from the moulds and preheats the mould for moulding.

When the die-set has closed, the mould is heated with dry steam at 260 KPa and the bead is forced under pressure, into the moulding cavity.

If the steam pressure is too high, the cup will "burn" or if it is too low, then the bead will not fuse properly.

There is also a critical relationship between the pressure at which the bead is forced into the mould and the length of the fill time.

If the pressure is too high, a "back-pressure" is created preventing the bead from flowing into the mould and if it is too low, insufficient bead will flow into the mould. Similarly, if the fill time is too short, the mould will not be filled and if it is too long, the bead at the base of the cup is "overpacked" and does not fuse correctly.

Typically, for a 175 ml cup the fill-time is approximately 0.7 s. and the fill-pressure 160 KPa.

After the mould has been filled, dry steam at 260 KPa is passed through the bead in the mould cavity to complete the expansion and fusing of the bead.

If the steam is not dry, the moisture will prevent successful fusion of the beads.

If the pressure is too high, the beads will be disturbed as the steam flows through, to the extent that they cannot fuse and, if the pressure is too low, the steam injection time has to be lengthened.

Typically, the injection time is about 1.5 s.

At the end of the injection time, both mould heating and steam injection cease.

At the same instant that the dry steam is switched off, cooling water at 550 KPa and 45 degrees C. is passed through the mould. The die-set then opens and the cup is blown off the mould.

If the cooling is inadequate, the cup will post-expand and deform after ejection. If the cooling is too severe, the cup will shrink onto the mould core and not be ejected.

According to another aspect of the invention, the substantially static-free cups or containers so manufactured from the cellular expanded or foamed thermoplastic beads, consisting of fully-expanded and fused bead, each bead entirely coated by an anti-static agent thereby separating adjacent beads with anti-static agent with the exterior and interior surfaces of the cup or container carrying a coating of anti-static agent. Suitable anti-static agents consist of at least one member of the following:

1. a fatty acid dialkylolamide, for example, lauric diethanolamide, coconut diethanolamide, myristic diethanolamide and stearic diethanolamide;
2. higher fatty acid esters of polyglycerols (HLB≧5), for example, polyglycerol esters of palmitic or stearic acids;
3. alkyl sulphates (alcohol sulphates, sulphated alcohols);
4. quaternized ethoxylated amines;
5. higher amine oxides;
6. aliphatic sulphonates;
7. citric acid esters of monoglycerides (HLB≧5);
8. alkyl dimethyl betaines;
9. sarcosinates;
10. fatty acid esters of lactylates (HLB≧5) for example, a lactylate ester of stearic or palmitic acid.

If the anti-static agent is applied to the bead during the pre-expansion of the bead, all the bead is entirely coated with the anti-static agent as it expands so that each pre-expanded bead is surrounded by a coating of the anti-static agent. Similarly, where the anti-static agent is applied during the final expansion of the bead in the mould when producing the cup or container from the fused mould, each bead separated by a layer of anti-static agent.

The preferred method of application comprises the combination of a sufficient amount of an anti-static agent as previously described:

(a) with thermoplastic bead to be expanded prior to injection into a pre-expander (preferably a hot air moisture-free pre-expander) and thereafter injecting the combination into the preheated pre-expander for pre-expanding (b) with the bead shortly after injection of the bead into a preheated moisture-free pre-expander for pre-expanding (c) in liquid form, with dry steam for delivery to a moulding cavity of a mould for intermixing with pre-expanded bead for moulding into the final article, whereby the anti-static agent upon contacting the heated environment is misted or atomized, filling the space of the environment uniformly coating the expanding bead and rendering the material anti-static.

The suitable anti-static agents include:

1. fatty acid dialkylolamides preferably prepared from a:
    (i) lauric diethanolamide
    (ii) coconut diethanolamide
    (iii) myristic diethanolamide
    (iv) stearic diethanolamide Examples of suitable lauric diethanolamides are marketed under the trade marks:
   (a) Lankrostat J.P. (by Diamond Shamrock U.K. Ltd.)
   (b) REWO AMID DL 203/S (By Rewo Chemicals Ltd.)
   (c) EMPILAN LDX (By Albright & Wilson Ltd.) (Lauric Diethanolamide 2:1)
   (d) MARLAMID D1218* (By Huls U.K. Ltd.)
   (e) EMPILAN LDE (by Albright & Wilson Ltd.) (Lauric Diethanolamide 1:1)
   (f) EMPILAN CDE-FF* (Lauric Diethanolamide 1:1)

Examples of suitable coconut diethanolamides are marketed under the trade marks:
   (a) MARLAMID D1218*
   (b) EMPILAN CDE/FF*

*(described in literature as both)

An example of a suitable myristic diethanolamide is marketed under the following trade mark:
   MONAMID 150MW (By DF Anstead Ltd., Mona Industries, U.S.A.)

An example of a suitable stearic diethanolamide is marketed under the trade mark:
   MONAMID 718 (By Anstead Ltd., Mona Industries, U.S.A.)

2. Higher fatty acid esters of polyglycerols (HLB≧5) for example, polyglycerol esters of palmitic or stearic acids comprising:
    (i) stearic/palmitic ester of polyglycerol Examples of stearic/palmitic esters of polyglycerols are marketed under the trade marks:
   (a) GRINDTEK PGE 55 (By Grinsted Products Ltd.)
   (b) GRINDTEK PGE 55/6 (By Grinsted Products Ltd.)

3. Alkyl sulphates. An example of a suitable alkyl sulphate is monoethanolamine lauryl sulphate marketed under the trade mark: EMPICOL LQ 33T.

4. Quaternized ethoxylated amines, for example:
    (i) quaternized coconut amine ethoxylate.

An example of a quaternized ethoxylated amine is marketed under the trade mark Ethoquad C12 (by Armour Hess Chemicals Ltd.)

5. Higher amine oxides, for example:
    (i) a cocoyl amine oxide marketed under the trade mark EMPIGEN OB by Albright & Wilson Ltd.

6. Aliphatic sulphonates, for example:
    (i) a product marketed under the trademark HOSTASTAT HS-1 (by Hoechst U.K. Ltd.)

7. Citric acid esters of monoglycerides (HLB≧5), for example:
    (i) a neutralized citric acid ester of monoglyceride made from edible refined hydrogenated fat comprising the main fatty acids, palmitic acid and stearic acid marketed under the trade mark GRINDTEK CA-P (by Grinsted Products Ltd.)

8. Alkyl dimethyl betaines, for example:
    (i) a dodecyl dimethyl betaine marketed under the trade mark AMBITERIC D40.

9. Sarcosinates, for example:

(i) lauroyl sarcosine marketed under the trade mark CRODASINIC L.

10. Fatty acid esters of lactylates (HLB≧5), for example,
- (i) a lactylate ester of stearic or palmitic acid or stearic/palmitic esters of lactic acid, including:
  - (a) sodium steroyl-2-lactylate marketed under the trade mark GRINDTEK FAL-1 by Grindsted Products Ltd.

The invention will now be illustrated with reference to the following drawings and discussions of examples of embodiments of the invention.

DETAILED DESCRIPTION OF DRAWINGS AND EMBODIMENTS

Figure 1:
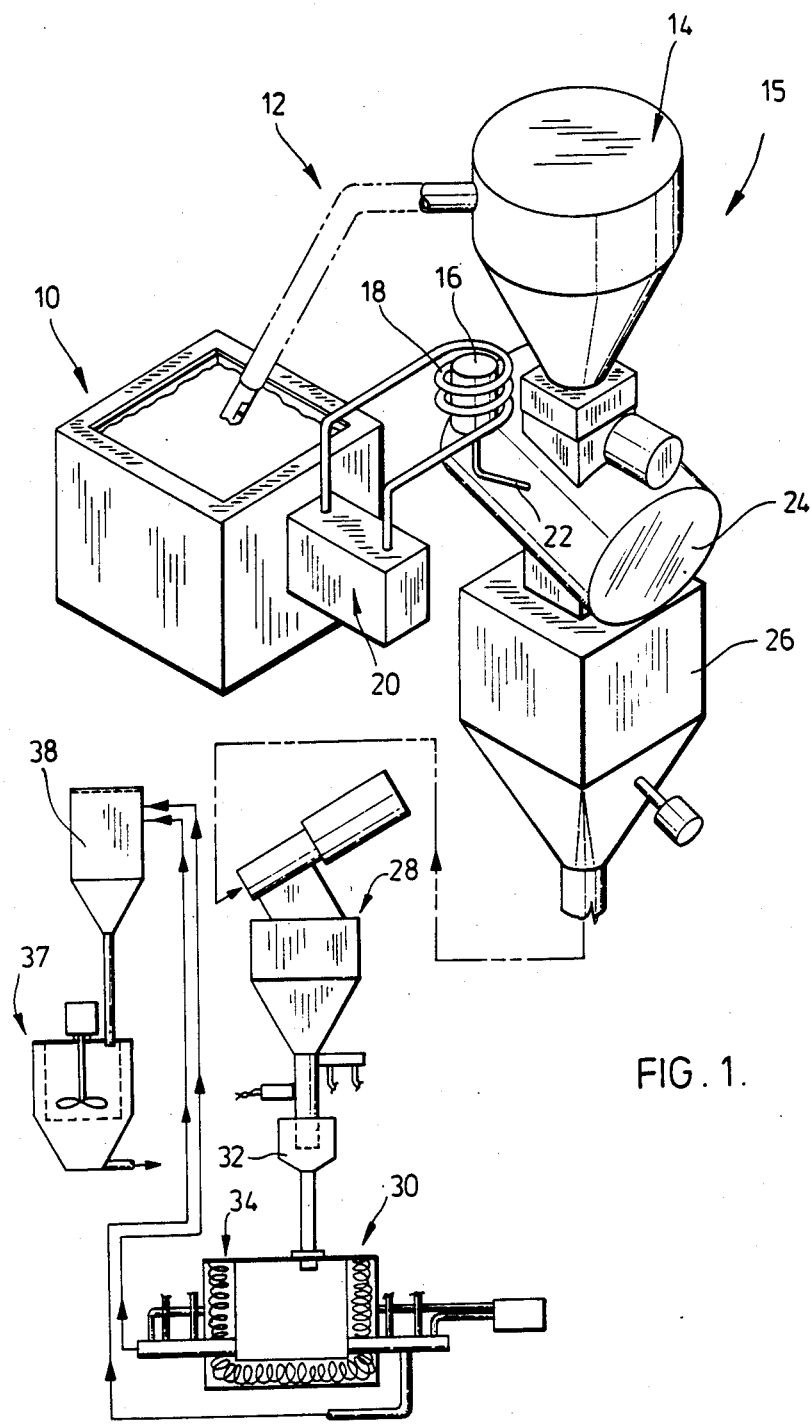
FIG. 1 illustrates pre-expansion equipment used to coat beads of thermoplastic material to be expanded, with an anti-static surface agent or emulsifier according to one embodiment of the invention.

With reference to FIG. 1, there is shown storage bin 10 containing beads of polystyrene containing a blowing agent in such proportions as are necessary for expansion. Intake tube 12 takes bead into hopper 14 of Conair Preblender 15. Solid anti-static agent (lauric diethanolamide), in powder form is maintained in refrigerated storage container 16 at a temperature below which the agent melts or becomes sticky, by coils 18 of refrigeration unit 20. Anti-static material is metered through inlet tube 22 into mixing chamber 24 at a rate of 0.5% by weight of anti-static agent lauric diethanolamide material to the thermoplastic bead (with blowing agent) fed into chamber 24 to be mixed therewith. The mixed material is then collected in chute 26 and fed into inlet hopper 28 of pre-expander 30. The mixed material is maintained refrigerated and is premeasured in sight glass 32 for addition to pre-expansion chamber 34 wherein the temperature is between about 275 degrees F. (135 degrees C.), and about 300 degrees F. (149 degrees C.). Because pre-expansion of the bead takes place at a temperature of about 212 degrees F. (100 degrees C.), the anti-static agent mists or vaporizes in the heated environment, coating the expanding beads. At that temperature the solid anti-static material, it is thought, quickly atomizes or mists, filling the chamber. As the expanding bead fills the chamber, the bead is uniformly coated by mist, taking the material onto the outer surfaces of the expanding beads. After the pre-expansion process, the coated pre-expanded bead is conducted to hopper 35 and fed to sizer 37.

Figure 2:
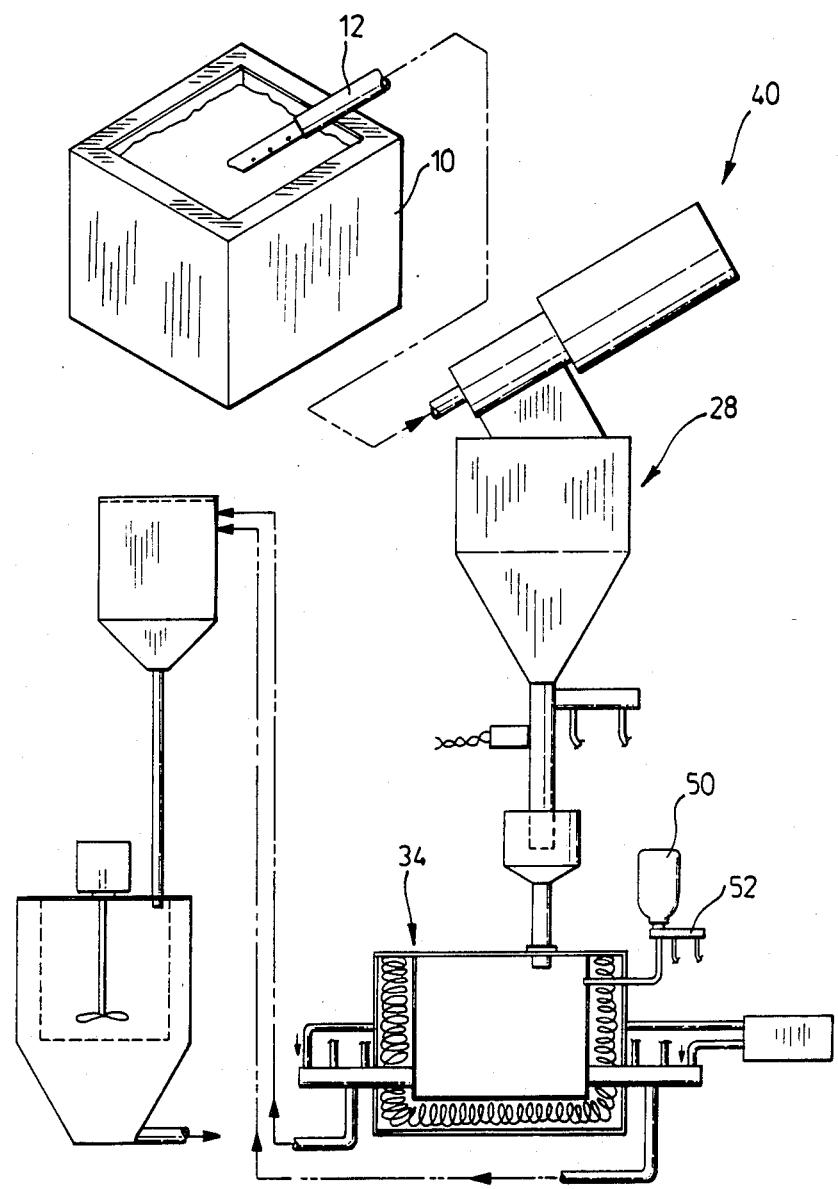
FIG. 2 illustrates pre-expansion equipment used to coat beads of thermoplastic material to be expanded, with an anti-static surface active agent or emulsifier according to another embodiment of the invention.

With reference to FIG. 2, pre-expansion equipment 40 has been provided for coating and covering the bead to be expanded with anti-static agent lauric diethanolamide in liquid form. In the equipment shown in FIG. 1, solid anti-static agent was fed into mixing chamber 24 with bead fed from hopper 14. In the embodiment shown in FIG. 2, Conair System Preblender 15 is unnecessary and the liquid anti-static agent is premeasured directly into pre-expansion chamber 34 through inlet 52, from storage container 50 in an amount of about 0.5% by weight of the bead to be expanded. Except for this modification, the equipment illustrated in FIG. 2 is the same as in FIG. 1. Therefore, with respect to the embodiment illustrated in FIG. 2, bead is fed directly from storage bin 10 by inlet tube 12 into hopper 28 and ultimately into preheated expansion chamber 34 as the premeasured liquid anti-static agent is metered from storage 50 through inlet 52 into chamber 34. When added to the preheated chamber, the liquid anti-static agent quickly atomizes and mists, filling the chamber covering the expanding bead. After pre-expansion, the pre-expanded bead is moved to storage for later use in moulding articles, for example, foamed cups and containers.

For illustration, the following anti-static agents are presented as suitable for use with polystyrene bead for the coating thereof in a pre-expansion process illustrated with reference to FIGS. 1 and 2 ultimately used to manufacture foamed cups and containers.

(a) Lankrostat J.P. (t.m.) by Diamond Shamrock (a non-ionic lauric diethanolamide);

(b) (i) Empilan LDE (t.m.) by Albright & Wilson —a non-ionic lauric diethanolamide (1:1), the equivalent of Lankrostat J.P. a solid block, much softer and less tractable than Lankrostat J.P.;

(ii) Empilan LDX (t.m.) by Albright & Wilson —lauric diethanolamide (diethanolamine to acid 2:1) solid block, even softer than Empilan LDE.

(c) REWO AMID DL 203/S by REWO Chemicals lauric diethanolamide (1:1 equivalent of Lankrostat J.P.) solid block, physical form less advantageous than that of Lankrostat J.P.;

(d) Marlamid D 1218 by Huls U.K. Ltd.—coconut diethanolamide liquid;

(e) Hostastat HS-1 (t.m.), an aliphatic sulphonate, from Hoechst U.K. Ltd. supplied as a granular power.

The material is odourless and physiologically harmless (Commission on Plastics of the Federal German Ministry of Health).

The material is water soluble, (i.e. HLB≧13);

(f) RS/B/10/2, Lankrostat JP (t.m.) to which 10% of Alusil AS (t.m.) a synthetically precipitated form of hydrated sodium aluminosilicate, from Crossfield, had been added;

(g) RS.B/11/2, Lankrostat JP (t.m.) to which 10% Speswhite China Clay, from English China Clays, had been added;

(h) RS/B/14/2 Lankrostat JP (t.m.) to which 10% Alusil AS (t.m.) had been added;

(i) RS.B/18/2 Lankrostat JP (t.m.) to which 10% Snowfloss, a diatomaceous (silica) from Johns-Manville had been added;

(j) Empilan CDE.FF (t.m.) coconut diethanolamide from Albright & Wilson in liquid form;

(k) Monamid 150 MW (t.m.) a myristic diethanolamide (1:1 ratio of diethanolamide to myristic acid) from Mona Industries was flaked and was then ground in a mortar.

Additional other suitable anti-static agent may comprise:
(i) Empilan LDE
(ii) Monamid 718
(iii) Grindtek PGE 55; Grindtek PGE 55/6
(iv) Empicol LQ 33T
(v) Ethoquad C12
(vi) Empigen OB (vii) Grindtek CA-P
(viii) Ambiteric D40
(ix) Crodasinic L
(x) Grindtek FAL-1

Bead was pre-expanded using the equipment shown in FIG. 1 and 2 to carry out processes in accordance with embodiments of the invention, using EMPILAN LDE and MONAMID 150 MW as the anti-static agents (see the Chart following).

EVALUATIONS

On-site evaluations of cups moulded from pre-expanded bead incorporating an anti-static agent carrying out the processes and using the equipment in FIGS. 1 and 2, were carried out in two stages.

FIRST SERIES OF TESTS

The first tests carried out on moulded cups consisted of the following measurements:
(a) average cup weight
(b) effect of water immersion—to check for porosity—the cups were immersed in a bucket of water, base upwards.
(c) static charge (without rubbing) measured using a Simco Electrostatic locator with all apertures open and the base of the cup 2 inches from the probe.
(d) filling of stacks of cups with powdered coffee and shaking.

Evaluations (a), (b) and (c) were carried out in the order of a,c,b, on sets of 10 cups.

| ADDITIVE REF. | DURATION OF PRE-EXPANSION | DENSITY OF BEADS (lb./ft$^3$) | COMMENTS |
|---|---|---|---|
| (b) Empilan LDE | 3 min. 43 sec. | 4.35 | |
| (b) Empilan LDE | 2 min. 16 sec. | 3.3 | |
| (e) Monamid 150 MW | 12 min. 26 sec. | 4.2 | |
| (e) Monamid 150 MW | 7 min. 1 sec. | 6.3 | |
| (e) Monamid 150 MW | 5 min. 54 sec. | | |

By way of additional example, 750 gm. of "Dylite" expandable polystyrene beads were added to a dry pre-expander followed by 3.8 gm. of liquid Grindtek PGE 55 injected from a liquid dispenser maintained at 60° C. After 6½ minutes in the pre-expander at a maximum temperature of 105° C., pre-expanded beads having a density of 6.7 lbs. per cu. ft. were discharged into a storage hopper. The pre-expanded beads were moulded into cups using a dry steam heated/injected multi-cavity mould and moulding machine, to give cone shaped cups weighting about 2½ gm., which cups are easily released from the moulds. Cups when tested for anti-static properties showed no charge and no charge could be induced by stripping the cups from a stack or rubbing with nylon fabric or polyethylene foam at 25° C. and 47% relative humidity. When the above process was repeated using zinc stearate in place of Grindtek PGE55, the formed cups were readily statically charged to give a Codastat reading of −4000 volts, retaining −4000 V and −3500 V, 2 minutes and 15 minutes respectively, after charging.

Evaluation (d) was carried out on different sets of 10 cups see Table below).

As some cups were less than 24 hours old, static charge measurement and dispensing trial (using powdered chocolate) were repeated on a number of sets of cups.

| Reference | Material | Average Cup Weight | Water Immersion | Static Charge |
|---|---|---|---|---|
| batch 3 | Empilan CDE/FF | 2.65 g. | no leaks | 0 |
| batch 2 | | 2.82 g. | no leaks | 0 |
| batch 1 | | 2.76 g. | no leaks | 0 |
| | Hostastat HS-1 | 2.76 g. | no leaks | about 0 |
| | RS/B/11/2 | 2.82 g. | no leaks | 0 |
| | RS.B/10/2 | 2.98 g. | no leaks | 0 |
| | RS/B/14/2 | 2.89 g. | no leaks | 0 |
| | RS/B/18/2 | 2.82 g. | no leaks | 0 |
| | Monamid 150-MW | 3.10 g. | | about 0 |
| | Empilan LDE | 2.60 g. | no leaks | 0 |

SECOND SERIES OF TESTS

In the second series of tests, five selected groups from every moulding trial, including freshly made zinc stearate production cups were stored for three days. The static charge of all the cups was measured by the Simco Electrostatic Locator (base of the cup, distance 2", all apertures open, no rubbing, scale −400+400 V). The cups were filled with chocolate powder and the stacks of cups were examined after filling.

Conditions in the dispensing room as measured by Whirling Hygrometer were 23 degress C. 45% r.h.

| REFERENCE | STATIC CHARGE | STICKING AFTER FILLING (CHOCOLATE) |
|---|---|---|
| Empilan LDE | 0 | Nothing |
| Empilan LDE | 0 | |
| | 0 | Slight |
| | 0 | |
| | 0 | |
| | About 0 | |
| | 10 V | |
| RS/B/11/2 | 0 | Nothing |
| Monamid 150-MW | 0 | Nothing |
| RS/B/18/2 | 0 | Nothing |
| RS/B/10/2 | 0 | Nothing–Slight |
| RS/B/11/2 | 0 | Very Slight |
| Hostastat HS1 | 0 | Slight |
| Empilan CDE/FF | 0 | Very Slight |
| Empilan CDE/FF (1) | 0 | Nothing |
| (2) | 0 | Nothing |
| (3) | 0 | Nothing |
| Lankrostat JP | 0 | Nothing |

TABLE 1

| | | STATIC CHARGE-VOLTS (CODASTAT) | | | | | |
|---|---|---|---|---|---|---|---|
| TRADE NAME | INITIAL | AFTER CHARGING | 30 sec. DELAY | 2 min. DELAY | 17 hour RESIDUE | 21 hour RESIDUE | PREVIOUS RESULTS (SIMCO) VOLTS |
| Empilan LDE | 0 | 0 | 0 | 0 | 0 | 0 | 0 |
| Empilan LDE | 0 | −400 | −200 | −200 | 0 | 0 | 0 to 10 |
| Grindtek PGE 55 | 0 | −600 | 0 | 0 | 0 | 0 | 0 |
| Rs/B/11/2 | 0 | −400 | 0 | 0 | 0 | 0 | 0 |
| Monamid 150 MW | +200 | −900 | −600 | −600 | 0 | 0 | 0 |
| RS/B/10/2 | 0 | −500 | −200 | −100 | 0 | 0 | 0 |
| RS/B/11/2 | 0 | −700 | −600 | −600 | −200 | −200 | 0 |
| Hostastat HS-1 | −200 | 0 | 0 | 0 | 0 | 0 | 0 |

TABLE 1

MOULDED CUP STATIC CHARGE MEASUREMENT RESULTS.

| ANTI-STATIC ADDITIVE | CHEMICAL TYPE | INITIAL CHARGE VOLTS | CHARGE AFTER CHARGING VOLTS | | |
|---|---|---|---|---|---|
| | | | IMMEDIATE CHARGE | CHARGE REMAINING AFTER 30 SECONDS | CHARGE REMAINING AFTER TWO MINUTES |
| Lankrostat JP | Lauric Diethanolamide | −200 | −600 | −200 | 0 |
| RS/B/11/2 | Modified Lauric Diethanolamide | 0 | −400 | 0 | 0 |
| Empilan LDE | Lauric Diethanolamide | 0 | 0 | 0 | 0 |
| Empilan CDE/FF | Coconut Diethanolamide | 0 | 0 | 0 | 0 |
| Grindtek PGE 55 | Polyglycerol Ester | 0 | −600 | 0 | 0 |
| Hostastat HS-1 | Aliphatic Sulphonate | 0 | 0 | 0 | 0 |

RESULTS ON COATED FILMS TESTED AT 25 DEGREES C.

TABLE 1-continued

| TRADE NAME | STATIC CHARGE-VOLTS (CODASTAT) | | | | | | PREVIOUS RESULTS (SIMCO) VOLTS |
|---|---|---|---|---|---|---|---|
| | INITIAL | AFTER CHARGING | 30 sec. DELAY | 2 min. DELAY | 17 hour RESIDUE | 21 hour RESIDUE | |
| Empilan CDE/FF | 0 | 0 | 0 | 0 | 0 | 0 | 0 |
| Zinc Stearate | −1000 | −4000 | −4000 | −4000 | −1200 | −1200 | −150 to 400 |
| Lankrostat JP | −200 | −600 | −200 | 0 | 0 | 0 | 0 |

The experimental anti-static expanded polystyrene cups were moulded using about 0.5% Lankrostat JP by weight of expandable polystyrene beads, when the beads were pre-expanded using the equipment shown in FIG. 2. This quantity of Lankrostat JP gave good anti-static properties to the cups.

To investigate the distribution of the anti-static agent Lankrostat JP in the cups, three methods were used:

1. Soxhlet extraction with distilled water to examine the soluble material extractable from the surface of the cup.
2. Staining of the cup with a fluorescent dye (Eosin) and examination of the fluorescence under ultra-violet light, using a standard zinc stearate containing EPS cups as a comparison standard.
3. Washing the surface of the cup with hot distilled water, followed by drying of the cup and checking of the charge and the acceptance of induced charge.

Tests and Results

1. Soxhlet Extraction

An accurately weighed piece of expanded polystyrene cup, containing about 0.5% by weight Lankrostat JP, was soxhlet extracted continuously for six hours in distilled water. The amount of material extracted was 0.13% by weight.

2. Staining and Fluorescence Examinations

A moulded cup containing Lankrostat JP and a cup containing zinc stearate were immersed in a dilute solution of eosin, in distilled water for 3 minutes at 55 degrees C. The surfaces of the cups were then rinsed with distilled water and the extent of staining was examined under ultra-violet light at 300–400 nanometers (nm).

The Lankrostat JP cup leaked the eosin solution to the inside and where this occurred, there was an even distribution of stain over the inside face. The outer surfaces of the cup were heavily and uniformly stained.

These tests appeared to indicate that the cup was uniformly coated by Lankrostat JP over both inside and outside surfaces of the cup. The cup containing zinc stearate was only very very lightly, though uniformly stained.

3. Surface Washing.

The surface of a moulded cup containing Lankrostat JP was washed by immersion in distilled water at 80 degrees C. for thirty minutes and the surface then dried at 70 degrees C. for thirty minutes. Residual static charge measurements on the washed cup and attempts to induce charge, measured by Codastat, were the same as on the original cup.

It appears from the evidence of all three tests that the Lankrostat JP is dispersed throughout the body of a moulded cup and is also present as thin surface layers. The anti-static performance appears not to be solely dependant on the surface layers, as adequate anti-static performance remains once the surface layers are removed.

Anti-Static Cups By Coating of Moulded Cups

A preliminary test, made primarily in relation to the development of a film coating test method for assessing surfactant anti-static agents, showed that standard zinc stearate-containing expanded polystyrene cups could be rendered anti-static by coating with a solution/dispersion of a suitable anti-static agent selected from the listed anti-static agents. For example, when a zinc stearate-containing cup was coated by brushing on a 10% w/wt disperson of Grindtek PGE55 (polyglycerol stearate/palmitate) in hexane, the cup became anti-static on drying and no charges could be induced by the standard test procedure, as measure by Codastat.

Evaluation (By Codastat) of Moulded Expanded Polystyrene Cups With Anti-Static Agent For Anti-Static Properties Pre-test Conditioning: The test cups were placed 15 cm. apart on a clean, insulated, charge-free glass plate and conditioned at 25 degrees C. and 30% RH for one hour before test.

Static Charge Measurements: Six measurements were made on each test sample as follows:
1. Initial charge present, after conditioning;
2. Charge induced after charging by rubbing with Nylon for 5 seconds;
3. Charge 30 seconds after induction;
4. Charge 2 minutes after induction;
5. Residual charge after 17 hours;
6. Residual charge after 21 hours.

Results are given in Table 1.

TABLE 1-continued

| POTENTIAL ANTI-STATIC ADDITIVE | CHEMICAL TYPE | MAXIMUM | AVERAGE | CHARGE REMAINING AFTER 15 MINUTES AND THEREAFTER |
|---|---|---|---|---|
| Lankrostat JP | Lauric Diethanolamide | −200 | 0 | 0 |
| Monamid 150 MW | Myristic Diethanolamide | 0 | 0 | 0 |
| Hostastat HS-1 | Aliphatic Sulphonate | 0 | 0 | 0 |
| Empicol LQ 33T | Monoethanolamine Lauryl Sulphate | 0 | 0 | 0 |
| Ethoquad C12 | Quaternised Coconut Amine Ethoxylate | 0 | 0 | 0 |
| Ambiteric D40 | Dodecyl Dimethyl Betaine | 0 | 0 | 0 |
| Empigen OB | Amine Oxide | −200 | −200 | 0 |

Moulded cups containing antistatic agents in the body of the cup tested in duplicate at 25° C. and 54% Relative Humidity

MOULDED CUP STATIC CHARGE MEASUREMENT RESULTS.

| ANTI-STATIC ADDITIVE | CHEMICAL TYPE | INITIAL CHARGE VOLTS | CHARGE AFTER CHARGING VOLTS | | |
|---|---|---|---|---|---|
| | | | IMMEDIATE | CHARGE REMAINING AFTER 30 SECONDS | CHARGE REMAINING AFTER TWO MINUTES |
| Grindtek PGE 55 | Polyglycerol Ester | 0 | 0 | 0 | 0 |
| Grindtek PGE 55 | Polyglycerol Ester | 0 | 0 | 0 | 0 |
| Grindtek FAL-1 | Stearoyl Lactylate | 0 | −200 | 0 | 0 |
| Grindtek FAL-1 | Stearoyl Lactylate | 0 | −200 | 0 | 0 |
| Ambiteric D40 | Dodecyl Dimethyl Betaine | 0 | 0 | 0 | 0 |
| Ambiteric D40 | Dodecyl Dimethyl Betaine | 0 | 0 | 0 | 0 |
| Ethoquad C 12 | Quaternized Coconut Amine Ethoxylate | 0 | 0 | 0 | 0 |
| Ethoquad C 12 | Quaternized Coconut Amine Ethoxylate | 0 | 0 | 0 | 0 |
| Empicol LQ 33T | Monoethanolamine Lauryl Sulphate | 0 | 0 | 0 | 0 |
| Empicol LQ 33T | Monoethanolamine Lauryl Sulphate | 0 | 0 | 0 | 0 |
| Empigen 08 | Amine Oxide | 0 | −200 | 0 | 0 |
| Empigen 08 | Amine Oxide | 0 | −100 | 0 | 0 |
| Crodasinic L | Lauryl Sarcosine | 0 | +200 | 0 | 0 |
| Crodasinic L | Lauryl Sarcosine | 0 | +200 | 0 | 0 |
| Monamid 150 MW | Myristic Diethanol Amide | 0 | −200 | 0 | 0 |
| Monamid 150 MW | Myristic Diethanol Amide | 0 | −300 | 0 | 0 |

1 MOULDED CUP STATIC (Containing Anti-Static Agent in the body of the cup)
STATIC CHARGE MEASUREMENT RESULTS
MOULDED CUPS TEST (SOME IN DUPLICATE) 25° C. and 47% R.H.

| POTENTIAL ANTI-STATIC ADDITIVE | CHEMICAL TYPE | INITIAL CHARGE VOLTS | IMMEDIATE | REMAINING AFTER 30 SECONDS | REMAINING AFTER TWO MINUTES | REMAINING AFTER AFTER 15 MINUTES |
|---|---|---|---|---|---|---|
| Lankrostat JP | Lauric Diethanolamide | 0 | −500 | −100 | 0 | 0 |
| RS/B/11/2 | Lauric Diethanolamide | 0 | 0 | 0 | 0 | 0 |
| RS/B/10/2 | Lauric Diethanolamide | 0 | −600 | −300 | 0 | 0 |
| RS/B/10/2 | Lauric Diethanolamide | 0 | −1000 | −800 | −400 | 0 |
| Empilan LDE | Lauric Diethanolamide | 0 | −300 | 0 | 0 | 0 |
| Empilan LDE | Lauric Diethanolamide | 0 | 0 | 0 | 0 | 0 |
| Empilan CDE/FF | Coconut Diethanol amide | 0 | 0 | 0 | 0 | 0 |
| Monamid 150 MW | Myristic Diethanol amide | 0 | −200 | 0 | 0 | 0 |
| Monamid 150 MW | Myristic Diethanol amide | 0 | −500 | 0 | 0 | 0 |
| Monamid 150 MW | Myristic Diethanol amide | 0 | −1400 | 0 | 0 | 0 |
| Monamid 150 MW | Myristic Diethanol amide | 0 | +1000 | −200 | −200 | 0 |
| Monamid 150 MW | Myristic Diethanol amide | 0 | −200 | 0 | 0 | 0 |
| Crodasinic L | Lauryl Sarcosine | 0 | −1000 | −200 | 0 | 0 |
| Crodasinic L | Lauryl Sarcosine | 0 | −400 | −100 | 0 | 0 |
| Grindtek CA-P | Citric Acid Ester | 0 | −100 | 0 | 0 | 0 |
| Grindtek FAL-1 | | 0 | 0 | 0 | 0 | 0 |
| Grindtek PGE 55 | Polyglycerol Ester | 0 | 0 | 0 | 0 | 0 |
| Grindtek PGE 55 | Polyglycerol Ester | | 0 | 0 | 0 | 0 |
| Hostastat HS-1 | Aliphatic Sulphonate | 0 | 0 | 0 | 0 | 0 |
| Empicol LQ33T | Monoethanolamine Lauryl Sulphate | 0 | 0 | 0 | 0 | 0 |
| Ethoquad C12 | Quaternised Coconut Amine Ethoxylate | 0 | 0 | 0 | 0 | 0 |
| Ambiteric D40 | Dodecyl Dimethyl | 0 | 0 | 0 | 0 | 0 |

TABLE 1-continued

| TRADE NAME | Betaine Amine Oxide | | | | | |
|---|---|---|---|---|---|---|
| Epigen OB | | 0 | −100 | 0 | 0 | 0 |

| | RESULTS ON COATED FILMS | | | | |
|---|---|---|---|---|---|
| | RELATIVE HUMIDITY | CHARGE VOLTS | | | |
| TRADE NAME | DURING TEST | INITIAL | MAXIMUM | AVERAGE | AFTER 15 MINUTES |
| Lankrostat JP | 26 | 0 | −200 | 0 | 0 |
| Grindtek PGE 55 | 26 | 0 | −400 | 0 | 0 |
| Empicol LQ 33T | 25 | 0 | 0 | 0 | 0 |
| Ethoquad C12 | 25 | 0 | 0 | 0 | 0 |
| Empigen OB | 25 | 0 | −200 | −200 | 0 |
| Marlamid 1218 | 41 | 0 | 0 | 0 | 0 |
| Hostastat HS-1 | 41 | 0 | 0 | 0 | 0 |
| Monamid 150 MW | 41 | 0 | 0 | 0 | 0 |
| Grindtek Ca-P | 41 | 0 | −400 | −200 | 0 |
| Ambiteric D40 | 34 | 0 | 0 | 0 | 0 |
| Crodasinic L | 27 | 0 | −500 | −300 | 0 |

Figure 3:
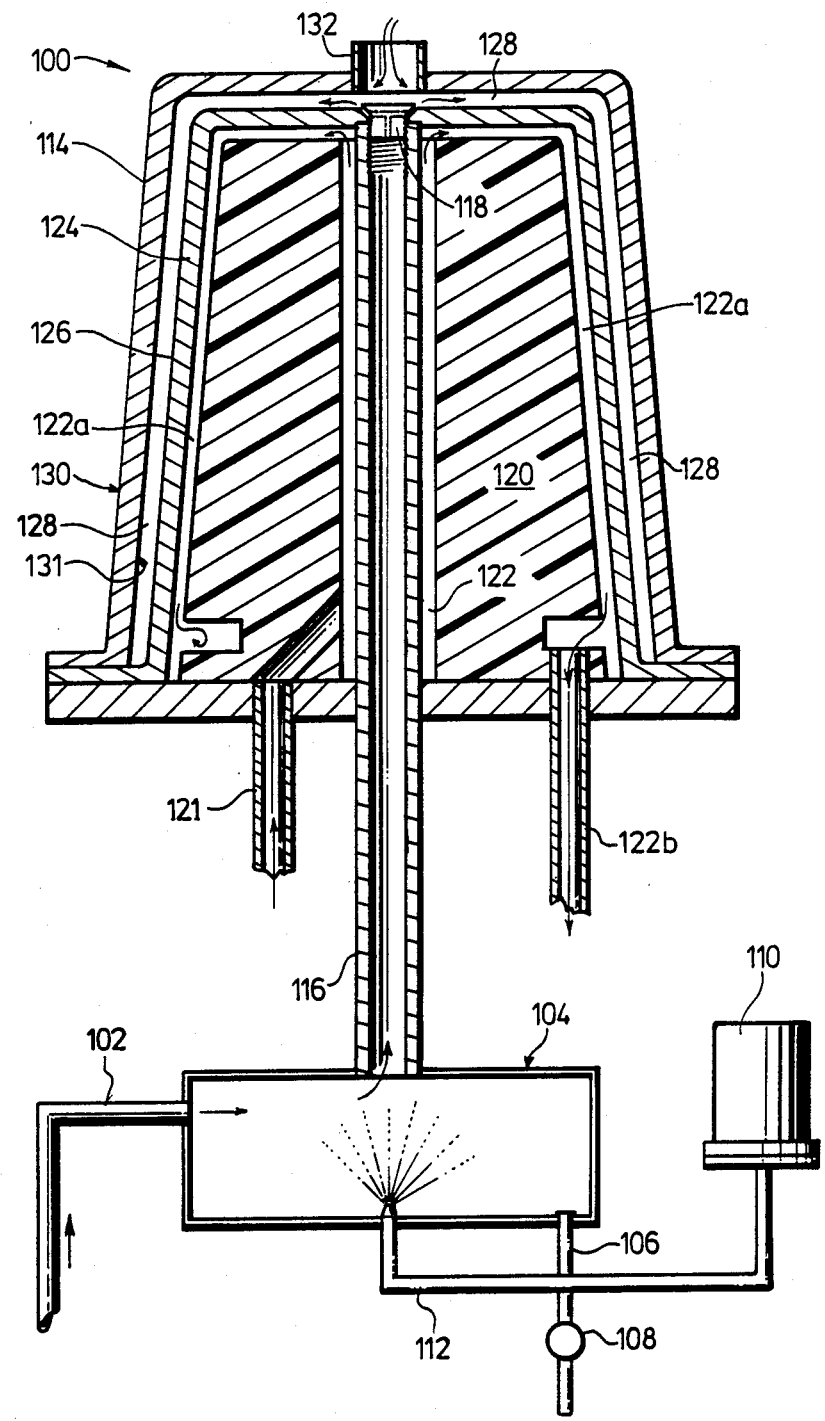
FIG. 3 is a cross-sectional view through moulding equipment used to expand pre-expanded beads with an anti-static agent according to another aspect of the invention.

With reference to FIG. 3, a schematic of part of moulding equipment generally shown at 100 is shown comprising steam inlet 102 leading into steam manifold 104 having condensate drain 106 carrying bleeder valve 108 leading to a drain (not shown). Liquid anti-static agent (Lauric Diethanolamide) is metered from storage 110 through metering line 112 into steam manifold 104 in an amount equal to about 0.5% weight of the pre-expanded bead to be fully expanded into the final article (a cup) in mould 114. When the anti-static agent (Lauric Diethanolamide) contacts the steam, it atomizes or mists.

Outline 116 leading from steam manifold 104 is shown leading into mould 114 past screw adjustable regulator 118 outside of inner core 120 and outer core 124 of mould 114. Surrounding outlet 116 leading into mould 114 is annular inlet 122 surrounding tube 116 for passing steam from tubing 121 through annular inlet 122 into annular gap 122A between inner core 120 and outer core 124 for heating same and being removed through outlet 122B.

Mould cavity 130 is spaced from the outer surface 126 of outer core 124 when secured therewith to present expansion chamber 128 between the outer surface of 126 and the inner surface 13. Inlet 132 for pre-expanded bead feeds pre-expanded bead (not shown) into chamber 128. After the bead is fed into chamber 128, it is coated with the misted or atomized anti-static agent which is passed between the beads in chamber 128.

As many changes can be made to the embodiments and the anti-static agents employed therein to illustraate the invention, it is intended that all matter contained in the embodiments of the invention including exemplary anti-static agents, be interpreted as illustrative of the invention and not in a limiting sense.

The embodiments of the invention in which an exclusive property or privilege is claimed are as follows:

1. A process of combining an anti-static agent with thermoplastic beads to be pre-expanded for use to manufacture cups or containers of cellular expanded or foamed thermoplastic material, or fully expanded into a cup or container of cellular expanded or foamed thermoplastic material, the anti-static agent being suitable for use with comestibles and being combined in sufficient amounts either:

(a) with thermoplastic beads to be expanded prior to injection into a hot air moisture free pre-expander, and thereafter injecting the combinations into the preheated hot air moisture free pre-expander for pre-expanding the beads; or (b) with the beads in a preheated hot air moisture free pre-expander shortly after injection of the beads into the preheated hot air moisture free pre-expander for pre-expanding the beads; or (c) in liquid form the hot moisture free air for delivery to a mold cavity for intermixing with pre-exapnded beads for molding into the cup or container, whereby the anti-static agent upon contacting the said heated environment is misted or atomized, filling the space of the environment, uniformly coating the expanding beads with anti-static agent in the pre-expander or mold rendering the material anti-static.

2. The process of claim 1, wherein the process consists only of step (a) whereby the anti-static agent is combined in sufficient amounts with thermoplastic beads to be expanded prior to injection into a pre-expander and thereafter, injecting the combination into the preheated hot air moisture free pre-expander for pre-expanding the beads whereby the anti-static agent upon contacting the heated environment is misted or atomized, filling the pre-expander, uniformly coating the expanding beads with the agent, rendering the material anti-static.

3. The process of claim 1, wherein the process consists only of step (b) and the anti-static agent is combined in sufficinet amounts with the beads in a preheated hot air moisture-free pre-expander shortly after injection of the beads into the pre-heated hot air moisture pre-expander for pre-exapnding the beads whereby the anti-static agent upon contacting the heated environment is misted or atomized, filling the pre-expander uniformly coating the expanding beads with the agent rendering the material anti-static.

4. The process of claim 1, wherein the process consists only of step (c) whereby anti-static agent is combined in sufficient amounts in liquid form, with hot moisture-free air for delivery to a mold cavity for intermixing with pre-expanded beads for moulding into the cup or container whereby the anti-static agent upon contacting the heated environment is misted or atomized, filling the space of the environment, uniformly coating the expanding beads with the agent in the space, rendering the material anti-static.

5. The process of claim 1, wherein if the agent is in solid form and melts at a temperature less than room or ambient temperature, the further step of maintaining the solid at a temperature below its melting point whereat it becomes sticky, until just prior to heat being applied.

6. The process of claim 2, wherein if the agent is in solid form and melts at a temperature less than room or ambient temperature, the further step of maintaining the solid at a temperature below its melting point whereat it becomes sticky, until heat is applied.

7. The process of claim 3, wherein if the agent is in solid form and melts at a temperature less than room or ambient temperature, the further step of maintaining the solid at a temperature below its melting point whereat it becomes sticky until heat is applied.

8. The process of claim 1, wherein the agent is in solid form.

9. The process of claim 2, wherein the agent is in solid form.

10. The process of claim 3, wherein the agent is in solid form.

11. The process of claim 1, wherein the agent is in liquid form.

12. The process of claim 2, wherein the agent is in liquid form.

13. The process of claim 3, wherein the agent is in liquid form.

14. The process of claim 4, wherein the agent is in liquid form.

15. The process of claim 1, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

16. The process of claim 2, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

17. The process of claim 3, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

18. The process of claim 4, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

19. The process of claim 5, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

20. The process of claim 6, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

21. The process of claim 7, wherein the anti-static agent is at least one member selected from the group consisting of:
(a) a fatty acid dialkylolamide;
(b) a higher fatty acid ester of polyglycerol (HLB$\geq$5);
(c) an alkyl sulphate;
(d) a quaternized ethoxylated amine;
(e) a higher amine oxide;
(f) an aliphatic sulphonate;
(g) a citric acid ester of a monoglyceride (HLB$\geq$5);
(h) alkyl dimethyl betaines;
(i) a sarcosinate;
(j) a fatty acid ester of a lactylate (HLB$\geq$5).

22. The process of claim 1, wherein the agent has been added in an amount of, or in excess of, about 0.1% by weight of the beads to be expanded.

23. The process of claim 2, wherein the agent has been added in an amount of, or in excess of, about 0.1% by weight of the beads to be expanded.

24. The process of claim 3, wherein the agent has been added in an amount of, or in excess of, about 0.1% by weight of the beads to be expanded.

25. The process of claim 4, wherein the agent has been added in an amount of, or in excess of, about 0.1% by weight of the beads to be expanded.

26. The process of claim 1, wherein the agent has been added in an amount up to about 5% by weight of the beads to be expanded.

27. The process of claim 2, wherein the agent has been added in an amount up to about 5% by weight of the beads to be expanded.

28. The process of claim 3, wherein the agent has been added in an amount up to about 5% by weight of the beads to be expanded.

29. The process of claim 4, wherein the agent has been added in an amount up to about 5% by weight of the beads to be expanded.

30. The process of claim 15, wherein the agent has been added in an amount of, or in excess of, about 0.1% by weight of the beads to be expanded.

31. The process of claim 15, wherein the agent has been added in an amount up to about 5% by weight of the beads to be expanded.

32. The process of claim 16, wherein the agent has been added in an amount of, or in excess of, about 0.1% by weight of the beads to be expanded.

33. The process of claim 16, wherein the agent has been added in an amount up to about 5% by weight of the beads to be expanded.

34. The process of claim 17, wherein the agent has been added in an amount of, or in excess of, about 0.1% by weight of the beads to be expanded.

35. The process of claim 17, wherein the agent has been added in an amount up to about 5% by weight of the beads to be expanded.

36. The process of claim 18, wherein the agent has been added in an amount of, or in excess of, about 0.1% by weight of the beads to be expanded.

37. The process of claim 18, wherein the agent has been added in an amount up to about 5% by weight of the beads to be expanded.

38. The process of claim 19, wherein the agent has been added in an amount of, or in excess of, about 0.1% by weight of the beads to be expanded.

39. The process of claim 19, wherein the agent has been added in an amount up to about 5% by weight of the beads to be expanded.

40. The process of claim 20, wherein the agent has been added in an amount of, or in excess of, about 0.1% by weight of the beads to be expanded.

41. The process of claim 20, wherein the agent has been added in an amount up to about 5% by weight of the beads to be expanded.

42. The process of claim 21, wherein the agent has been added in an amount of, or in excess of, about 0.1% by weight of the beads to be expanded.

43. The process of claim 21, wherein the agent has been added in an amount up to about 5% by weight of the beads to be expanded.

44. The process of claim 1, wherein the anti-static agent is coconut diethanolamide, myristic diethanolamide or stearic diethanolamide.

45. The process of claim 1, wherein the anti-static agent is stearic/palmitic ester of polyglycerol with $HLB \geq 5$.

46. The process of claim 1, wherein the anti-static agent is monoethanolamine lauryl sulphate.

47. The process of claim 1, wherein the anti-static agent is quaternized coconut amine ethoxylate.

48. The process of claim 1, wherein the anti-static agent is cocoyl amine oxide.

49. The process of claim 1, wherein the anti-static agent is an aliphatic sulphonate.

50. The process of claim 1, wherein the anti-static agent is a neutralized citric acid ester of monoglyceride with an $HLB \geq 5$.

51. The process of claim 1, wherein the anti-static agent is dodecyl dimethyl betaine.

52. The process of claim 1, wherein the anti-static agent is lauroyl sarcosine.

53. The process of claim 1, wherein the anti-static agent is a lactylate ester of stearic or palmitic acid or stearic/palmitic esters of lactic acid.

54. The process of claim 1, wherein the anti-static agent is sodium steroyl-2-lactylate.

* * * * *